Dec. 8, 1925.

T. R. HARRISON ET AL 1,565,093

METHOD OF AND APPARATUS FOR MAKING PYROMETRIC AND OTHER MEASUREMENTS

Filed April 19, 1919   3 Sheets-Sheet 1

Inventors
Thomas Randolph Harrison
and
Paul Darwin Foote
by, Robertson & Johnson
Attorneys.

Inventors
Thomas Randolph Harrison
and
Paul Darwin Foote
by, Robertson & Johnson
Attorneys.

Dec. 8, 1925.  1,565,093
T. R. HARRISON ET AL
METHOD OF AND APPARATUS FOR MAKING PYROMETRIC AND OTHER MEASUREMENTS
Filed April 19, 1919  3 Sheets-Sheet 3

Inventors
Thomas R. Harrison
Paul Darwin Foote
By Vernon E. Hodges
their Attorney Patented Dec. 8, 1925.

1,565,093

UNITED STATES PATENT OFFICE.

THOMAS RANDOLPH HARRISON AND PAUL DARWIN FOOTE, OF WASHINGTON, DISTRICT OF COLUMBIA; SAID FOOTE ASSIGNOR TO SAID HARRISON.

METHOD OF AND APPARATUS FOR MAKING PYROMETRIC AND OTHER MEASUREMENTS.

Application filed April 19, 1919. Serial No. 291,377.

*To all whom it may concern:*

Be it known that we, THOMAS RANDOLPH HARRISON and PAUL DARWIN FOOTE, citizens of the United States of America, and residents of Washington, District of Columbia, have invented certain new and useful Improvements in Methods of and Apparatus for Making Pyrometric and Other Measurements, of which the following is a specification.

Our invention relates to an improved method of making pyrometric and other measurements and to apparatus for carrying out the said method. So far as the method is concerned, our purpose has been to devise a simple method of making pyrometric and other measurements not requiring calculation on the part of the person employing the method and not involving the use of any other source of E. M. F. than the source being measured, but nevertheless allowing for the variation in the resistance of the line and thermocouple or other source of E. M. F. being measured, although the amount of said resistance need not be known to the person using the method or indeed be ascertained at all. Broadly speaking, the method consists of observing, under certain conditions as to resistance, the deflection of an instrument operating on the galvanometric principle and located in the circuit whose E. M. F. is being measured, varying the resistance conditions of the circuit in a manner hereinafter described and securing with the same source of E. M. F. under the changed resistance conditions the same deflection in the instrument or a deflection bearing a known relation thereto. By varying the resistance, this method keeps the total resistance, including the line and couple resistance, a pre-assigned constant under the one set of resistance conditions and a different pre-assigned constant under the other. It is to be noted also that by this method one determines and at the same time effects the adjustment of resistance requisite to give the desired relation between the respective deflections.

As to the apparatus: Our purpose has been—

To devise a robust instrument operating upon the galvanometric principle which, to the end that it may be robust, may have comparatively low resistance, which is simple, and in which the objectionable features usual in low resistance instruments are obviated;

To make it operable by any one of ordinary intelligence by merely observing indications and performing simple mechanical operations without making any calculations, or even writing down anything, and without the necessity of any knowledge as to the value of pre-assigned resistances forming a part of the apparatus;

To give increased sensitivity to the instrument so as to magnify the errors under one set of resistance conditions in the circuit in order to divide them and thereby minimize them under the final resistance conditions in the circuit;

To compensate for the temperature coefficient of the instrument to the desired extent by employing manganin and copper in the manner to be described and in the requisite ratio of copper to manganin.

In attaining these various objects, we provide means for making the sum of the external resistance, i. e., line resistance plus thermocouple resistance (or other source of E. M. F.) and a variable resistance or resistances a pre-assigned constant, and we use only the E. M. F. of the source being measured, that is, the E. M. F. of that source and the E. M. F. of no other. The apparatus provides resistance or resistances in series with an indicator operating on the galvanometric principle, and, when in use, in series also with the line and couple being measured. Several forms provide, in addition, two shunts normally open, one of which contains a resistance which may be placed in shunt with part of the circuit containing the galvanometer coil, and the other of which when closed short circuits or shunts part of the circuit; and means for simultaneously closing said shunts. By making the resistance in the shunt around part of the circuit containing the galvanometer coil comparatively small with reference to the resistance in the part shunted, increased sensitivity through the magnification and division of errors above referred to is secured. By employing manganin and copper in the shunt resistance in the ratio requisite to produce the result desired, the temperature coefficient of the indicator may be compensated to any appropriate extent. Other forms employ some what different arrangements of switches and resistances but operate towards the same ends.

The method is carried out (the apparatus having first been connected to the terminals of the circuit to be measured) by adjusting one or more variable resistances until substantially the same deflection is secured with the shunts open as with the shunts closed, or until the respective deflections bear a known relation. The relation of equality is most convenient.

Referring to the drawings.

Figure 1:
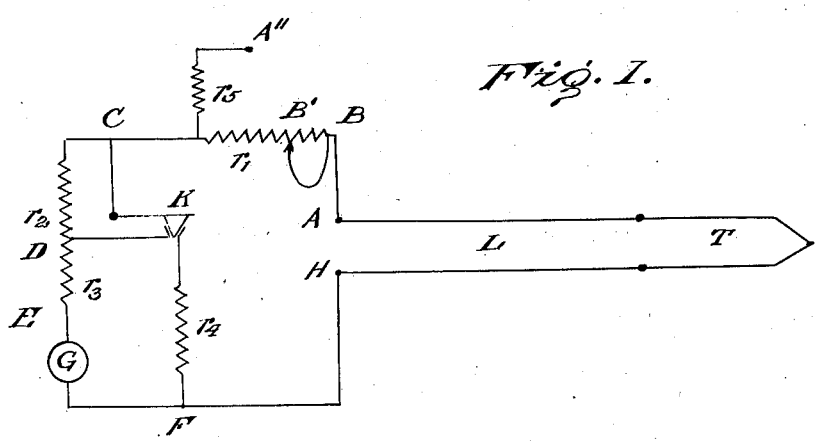
Fig. 1 is a diagram illustrating one form of the apparatus in connection with the thermocouple circuit to be measured.
Figure 3:
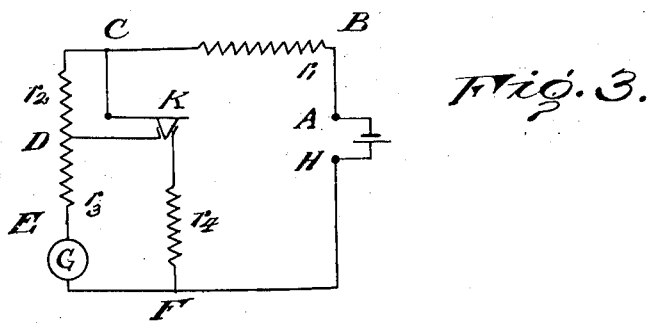

Fig. 3 is a diagram similar to Fig. 1 but showing a battery as the source of E. M. F. and showing the entire resistance CB in circuit.

Figure 2:
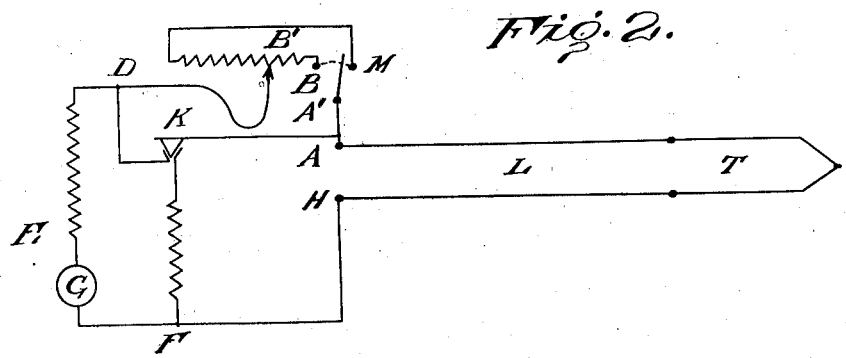
Fig. 2 is a diagrammatic view of a modification of the apparatus.
Figure 4:
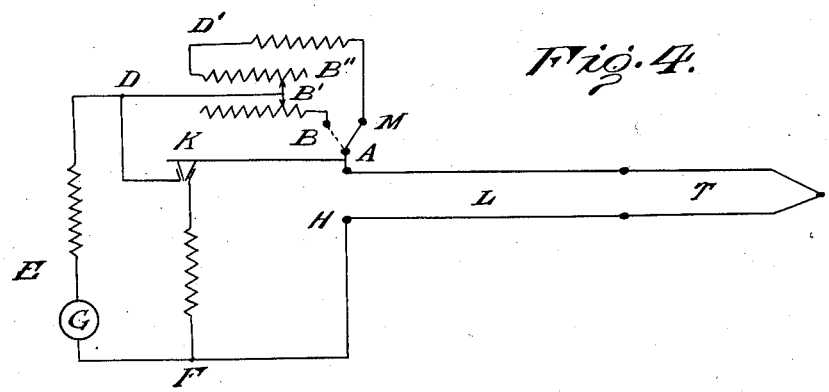
Figure 5:
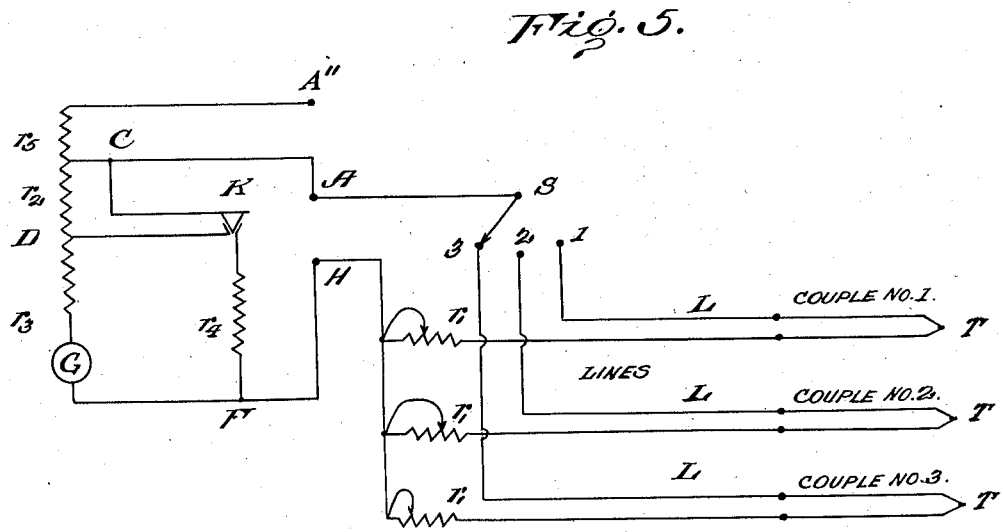

Fig. 4 is a diagram of another modification of the apparatus similar in general to that of Fig. 2, and Fig. 5 is a diagram showing the application of the invention to the respective measurement of the E. M. F. of a number of couples.

Figure 6:
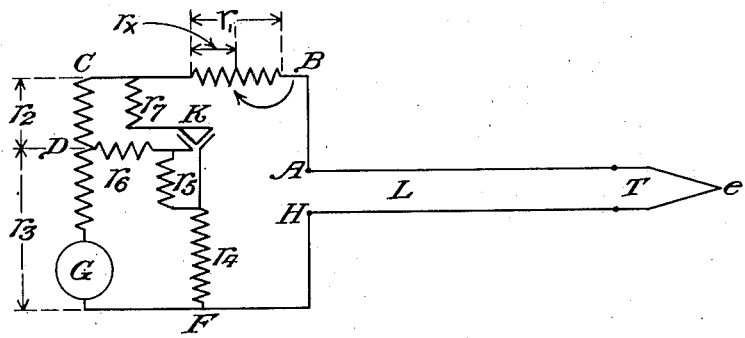
Figure 7:
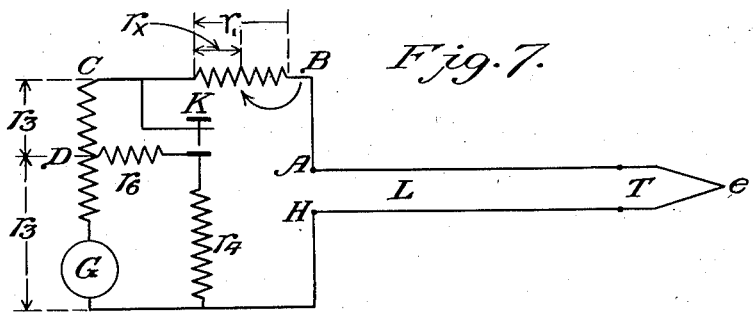
Figure 8:
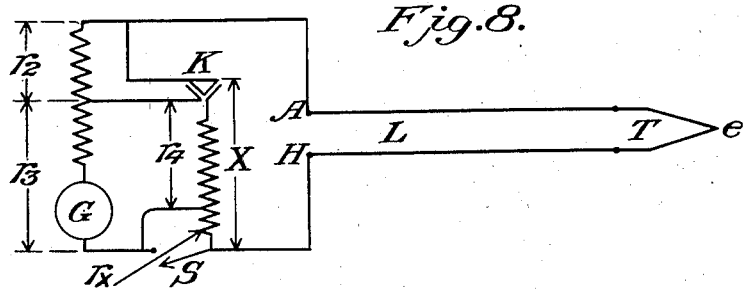

Figs. 6, 7 and 8 show slightly modified diagrams.

Our invention is an application of Ohm's law and its details and the theory on which it is based will be made more fully apparent in the following more extended description.

When a thermocouple in a furnace is connected to a millivoltmeter, galvanometer, or galvanometric recorder, the E. M. F. $e$, developed by the couple causes a current to flow around the circuit which in accordance with Ohm's law is equal to $e/R$ where R is the total resistance of the circuit. The deflection of the pointer of the instrument is approximately proportional to this current. Thus if the temperature of the furnace is constant, $e$ is constant, but the deflection of the pointer will be altered by changes in the resistance R. Hence any variation in the resistance R which produces a change in the reading of the instrument would be interpreted as a change in the temperature of the furnace although actually this is constant. The resistance R may be divided into three parts, that of the instrument itself, that of the lead wires and line, and that of the couple. The serious variations in R arise from changes in the resistance of the line and couple. By making the resistance of the indicator very high, the effect of the variations in the resistance of the line and couple is decreased. However, an indicator of sufficiently high resistance is difficult to construct and is less robust and less suitable for severe use in the industries than one of relatively low resistance. This question has been discussed in Metallurgical and Chemical Engineering, vol. 18, p. 404, 1918.

An instrument of low resistance must be calibrated for a definite line resistance and any change in the resistance of the line or couple will give rise to large errors in the temperature measurement. For the purpose of controlling the resistance, an adjustable rheostat may be placed in series with the couple. This rheostat is adjusted from time to time to compensate for the change is resistance of the line or couple with use. However, the objection to this method as heretofore applied is that it requires a considerable amount of auxiliary apparatus in order to determine the resistance of the line and the proper setting for the adjustable rheostat. Usually a Wheatstone bridge is employed. The present method obviates the necessity for the use of such instruments and by a very simple device readily fitted to the pyrometer indicator, a means is afforded for controlling the line resistance accurately to the pre-assigned value for which the indicator is calibrated. Hence robust indicators of low resistance can be employed and the factor of variable line resistance will occasion no error in the temperature measurement.

The present device in a simple form is illustrated by Fig. 1 where ABCDEGFH is an ordinary galvanometer circuit in which A and H are the binding post terminals which are connected by the line L to the thermocouple T. BC is an adjustable rheostat the maximum value of which is equal to the maximum line and couple resistance likely to occur in practice, for example 10 ohms. K is a push button switch which closes two shunts simultaneously. The adjustable resistance BC may be located, if desired, outside of the case of the instrument between A and T for example. When several couples are used with the same instrument as many rheostats (see Fig. 5) as there are couples may be employed, each rheostat being adjusted for its particular couple. For purposes of calibration only a special and closely accurate resistance $r_5$ which equals $$\frac{r_2 r_4}{r_3}$$

may be provided in the apparatus of any of the figures. It is shown in Figs. 1 and 5. The use of this exact resistance makes it possible to employ rough commercial resistances as the resistances $r_1$. The calibration is by the usual methods and is in terms of the potential drop between the terminals $A^{11}$ and H.

The theory of the above form of the apparatus is given below: Reference is also and particularly made to Fig. 3 which shows the symbols $r_1$, $r_2$, $r_3$, and $r_4$ for the resistances CBAHF (including the internal resistance of the source of E. M. F.); CD; DEGF; and KF respectively. If any one or more of these resistances is adjusted until the galvanometer reads the same whether the key (K) is closed or open then the expression for the relation between the resistances will be $$\frac{r_1}{r_2} = \frac{r_4}{r_3}.$$

From this it is seen that if any three of the resistances are pre-assigned, the fourth resistance can be brought to a definite value by means of the adjustment stated. [In the present case $r_1$ is the variable resistance and equals (CB'+L+T) of Fig. 1.]

Proof. Let $e'$ represent the potential drop across DEF when the key is open and $e''$ represent the drop when the key is closed. Then:

$$e' = \frac{er_3}{r_1 + r_2 + r_3}$$

and $$e'' = \frac{er_3 r_4}{r_1 r_3 + r_1 r_4 + r_3 r_4}$$

in which $e$ represents the impressed E. M. F. or the true potential drop across AH on open circuit.
Then:

$$\frac{e'}{e''} = \frac{r_1 r_3 + r_1 r_4 + r_3 r_4}{r_1 r_4 + r_2 r_4 + r_3 r_4}$$

from which, if three of the resistances and the ratio $$\frac{e'}{e''}$$

are known, the fourth resistance may be determined. If the instrument reads the same whether the key is open or closed, then $e' = e''$ and the above equation reduces to $$\frac{r_1}{r_2} = \frac{r_4}{r_3} \quad (2)$$

With the apparatus shown in Fig. 1 the method is carried out as follows:
1. Read instrument with key K open.
2. Close the key and adjust the rheostat BB' until instrument reads approximately the same as in 1.
3. Repeat 1 and 2 if necessary.
4. Then final reading is obtained with key open.

The adjustment alters the reading both when the key is closed and when it is open, but if $$\frac{r_4}{r_3}$$

is made equal to about $\frac{1}{5}$ to $\frac{1}{10}$ then the reading of the instrument is approximately 5 to 10 times as far from the correct value when the key is closed as when it is open. Consequently, if the instrument is made to read approximately the same whether the key is closed or open, the reading will be accurate when the key is open. This will be apparent from the following demonstration.

It has been shown that when the instrument reads the same whether the key is open or closed, the relation between the resistances is given by the equation:

$$\frac{r_1}{r_2} = \frac{r_4}{r_3}$$

or $$r_1 = r_2 \frac{r_4}{r_3}.$$

If the instrument is calibrated to read correctly when these resistances are related as above, then if the rheostat is out of adjustment by an amount $\delta r_1$, the instrument will read in fractional error when the key is open by an amount $$\delta e' = \frac{\delta r_1}{r_1 + r_2 + r_3}.$$

and when the key is closed by an amount $$\delta e'' = \frac{\delta r_1}{r_1 + \frac{r_3 r_4}{r_3 + r_4}}$$

($\delta e'$ and $\delta e''$ being respectively the fractional errors in the E. M. F. readings of the galvanometer when the key is open and closed.)
Whence $$\frac{\delta e'}{\delta e''} = \frac{r_1 r_3 + r_1 r_4 + r_3 r_4}{(r_3 + r_4)(r_1 + r_2 + r_3)}$$

if $$r_1 = r_2$$

and $$r_3 = r_4$$

then $$\frac{\delta e'}{\delta e''} = \frac{2 r_2 r_4 + r_4^2}{4 r_2 r_4 + 2 r_4^2} = \frac{1}{2}$$

or $$\delta e'' = 2 \delta e'$$

and $$\delta e'' - \delta e' = \delta e'$$

Therefore when $$\frac{r_4}{r_3}$$

equals 1 the difference between the readings will equal the error in the reading when the key is open. If, however, $$\frac{r_2}{r_1}$$

and $$\frac{r_3}{r_4}$$

are taken large, say, equal to 9, then $$\frac{\delta e'}{\delta e''} = \frac{r_1(10r_4) + 9r_4^2}{(10r_4)(10r_1 + 9r_4)} = \frac{1}{10}$$

or $$\delta e' = \frac{1}{10}\delta e''$$

whence $$\delta e'' - \delta e' = 9\delta e'$$

Thus when $$\frac{r_2}{r_1} = \frac{r_3}{r_4} = 9$$

the error with the key open is only one-tenth of the error when the key is closed or one-ninth of the difference beween the readings when the key is open and closed respectively. If the readings are made roughly equal, the error with the key open will be accordingly very small.

Fig. 2 shows another arrangement in which a two-point switch is used in addition to the extra parts shown in Fig. 1. The normal position of this switch is A'M, while for adjusting the rheostat it is set in position A'B. The reading is observed with the switch at A'B and the key K closed. The adjustment is made with the key K open. The rheostat of pre-assigned total resistance is adjusted so that resistance BB' equals the sum of the resistances L and T, this condition obtaining when the deflection is the same with the key open or closed. After the adjustment of the rheostat, the switch is set in position A'M with the result that a resistance equal to that of the leads and couple has been taken out of the rheostat. BB' being the resistance short circuited by depression of the key K in Fig. 2 corresponds with $r_2$ which is the resistance thus short circuited in Figs. 1, 3 and 5.

The advantage of this arrangement is that when the key is closed the reading of the instrument is independent of the position of the rheostat and therefore in adjusting the rheostat (which, as above stated, is done with the key K open) the required reading is accurately known. The disadvantages are (1) the necessity of the extra switch and the accompanying complication of operation and (2) the necessity of more careful settings, since here resistance DEGF and KF are equal, and therefore there is no extra sensitivity for setting as is obtained in the first case.

Fig. 4 shows a modification of Fig. 2 in which the increased sensitivity is realized. The slides on the double rheostat are operated simultaneously. The resistances in the two branches of the rheostat are related as follows:

$$\frac{B'B''}{B'B} = \frac{KF}{DEF}$$

By making this equal to about $\frac{1}{5}$ or $\frac{1}{10}$, greater sensitivity is realized, as in the first case, and B' B'' will equal L + T as in the second case (Fig. 2). Since BB' is of relatively high resistance, it may be desirable to place at MD' some of the resistance that would have been at DE. The amount thus removed does not affect the above relations at all, however. The arrangement in Fig. 1 is preferable to those of Figs. 2 and 4 for most industrial operations.

It will be understood that when the variable resistance is located otherwise than as illustrated the details of procedure in carrying out the method differ, but since such procedure always accords with the principles explained herein and since the process remains essentially the same no effort is made to enter into such details.

It is in practice often desirable to use a single instrument with any one of several couples at will. This may be done with the arrangement diagrammatically illustrated in Fig. 5 which shows an instrument ACDGFH capable of being connected to any one of three couples. An adjustable resistance $r_1$ is provided in the circuit of each couple. When the instrument is connected through the selective switch S to any individual couple and the corresponding resistance adjusted until the instrument reads the same whether the key is closed or open, then the total resistance CASTHF will equal $r_2 r_4/r_3$. By adding resistance $$r_5 = r_2 \frac{r_4}{r_3}$$

between a binding post A'' and $r_2$, binding posts A'' and H may be used for calibrating the instrument in terms of potential drop between these terminals, by the method ordinarily used in calibrating an indicator. The calibration thus obtained will apply accurately for all couples connected as shown in Fig. 5 and $r_1$, $r_1$ etc. may be rough commercial resistances, i. e. not absolutely exact.

Temperature coefficient compensation: If a thermocouple in a furnace at a steady temperature be connected to a galvanometer the galvanometer will deflect to a given position. Any increase in the temperature of the instrument causes a slight weakening of the springs, which tends to allow the galvanometer to deflect further, although the E. M. F. developed by the couple remains constant. This tendency is opposed by the effect of a decrease in the current, due to an increase in the internal resistance of the instrument with increasing temperature, and also by a slight decrease in the strength of the magnet. The resistance of a galvanometer is usually made up of a manganin resistance coil which has approximately zero temperature coefficient and a copper moving element, the resistance of which increases about 0.004 times its initial value for each degree (centigrade) rise in temperature.

The temperature coefficient of resistance of the instrument thus depends upon the ratio of the values of the resistances made up of copper and manganin in the circuit of the instrument, for example, the ratio of resistances of copper and manganin comprising circuit ABCDEGFH, Fig. 1. By properly proportioning the copper to the manganin, the magnet and current temperature changes can be made to neutralize, to a satisfactory degree, the effect of weakening of springs, and the instrument will have an almost zero temperature coefficient.

Instruments are often made with a much greater proportion of copper than is required for a zero temperature coefficient. This allows a more rugged construction suitable for shop use. One way of making such an instrument read correctly at different room temperatures would be to reduce the resistance by an amount nearly equal to the increase in the internal resistance of the instrument. The present apparatus may be arranged so that this adjustment will be included in the adjustment for variable line resistance without any extra constructional features or manipulation. This is done in the following manner:

Consider a galvanometer which has been calibrated to read correctly at a temperature $t'°C$. (Fig. 1). If the instrument is made up with the proper proportion of copper and manganin, as pointed out above, it will read correctly at any other room temperature $t°C$. If, however, there is too much copper in the circuit in proportion to the manganin, when the temperature increases to a value $t°C$. the resistance of the instrument will increase by too great an amount. In order to make the instrument read correctly at this new temperature, it will be necessary to remove from the circuit a resistance nearly equal to the increase in resistance. Referring to Fig. 1, and using the notation shown in Fig. 3 and other notation defined below, the amount of resistance necessary to be removed from the circuit in order that the calibration of the instrument may be correct at the new temperature $t°C$. may be found by experiment to be $\triangle R$. Then the amount of resistance, $\triangle r$, which should be removed for each degree rise in temperature of the instrument will be $$\triangle r = \frac{\triangle R}{t-t'}$$

In order that this adjustment may be effected along with the regular resistance adjustment of the instrument it is only necessary to proportion the ratios of copper to manganin in resistances $r_3$ and $r_4$ according to the following expression:

$$\frac{\%\ Cu.\ in.\ r_4'}{25000} = \frac{\%\ Cu.\ in.\ r_3'}{25000} - \frac{\triangle r}{r_1'},$$

$r_3'$ and $r_4'$ being the values of $r_3$ and $r_4$ at the temperature $t'°C$. at which the instrument was calibrated to read correctly, and $r_1'$ being equal to $$r_2 \frac{r_4'}{r_3'}$$

Although the description of the new instrument has been mainly concerned with the measurement of thermoelectric E. M. F.'s it is to be understood that the method is equally applicable to the measurement of line drop in any electrical installation. The instrument is also useful for measuring current in certain operations.

The instrument may of course be a recorder and where the claims use the term indicator they are not to be understood as excluding the recorder type of instrument. It is noted further that the resistance customarily associated with instruments of the galvanometric type as a part thereof may be the sole adjustable resistance and that the specifying, in certain claims, of the instrument or indicator and variable resistance in series with the thermocouple or source of E. M. F. does not require other resistance than that thus forming a part of the instrument.

We wish to make it clear also that the sensitivity of the indicator may be changed in a variety of ways, for instance the shunts may be electrical or they may be magnetic, the change may be effected by a spring tension, by cutting out turns on the moving coil of the galvanometer, etc.

It is convenient, but by no means essential, to use a resistance scale or scales with the rheostat or rheostats (BC, Fig. 1) so that the line and couple resistance and the resistance changes generally may be known. The determination or fixing of the resistance requisite to give the desired relation between the respective deflections is not dependent on the use of such scales or the acquiring of such knowledge.

The foregoing calculations have been based upon the assumption that branches CK and DK, Figs. 1, 3 and 5 (or AK and DK, Figs.

2 and 4) are of zero resistance and that when the key (K) is open the resistance from DK to KF across the gap at K is infinite. These conditions are readily realized in practice to an entirely satisfactory degree.

It is evident, however, that branches CK and DK may be made of appreciable resistance and the resistance across the gap at K between branches DK and KF may be made of finite value as shown Fig. 6 without altering the principle upon which the instrument operates.

The relation between the resistances shown in this figure, when the instrument reads the same whether the key is closed or open, is given by the following equation:

$$r_2 r_4 + \frac{r_3(r_1+r_2)(r_2 r_4 + r_4 r_6 - r_5 r_7)}{(r_2+r_6)(r_4+r_5+r_6)} = r_1 r_3 + \frac{r_2 r_6 (r_1 + r_4)}{r_2 + r_6}$$

Making $r_5$ equal to infinity and $r_6$ and $r_7$ equal to zero we have the diagram shown in Fig. 1 and the above equation reduces to the form $$r_2 r_4 = r_1 r_3,$$

or $$r_1 = \frac{r_2 r_4}{r_3}$$

This equation has already been made use of. If, however, the resistance $r_5$ is made equal to zero, the diagram shown in Fig. 6 will take the form shown in Fig. 7. In this diagram $r_7$ is not shown, being made equal to zero also for convenience of construction and operation. By making $r_5$ equal zero the above equation for Fig. 6 takes the form $$\frac{r_1}{r_2} = \frac{r_4}{r_6}$$

Thus when the resistance is adjusted in any one or more of the branches $r_1, r_2, r_4,$ or $r_6$ of the instrument until the deflection of the galvanometer is the same whether the key is depressed or not, the relation between these resistances will be as given in the latter equation above. A special case of such modifications is where the resistance across the gap with the key open is made equal to zero. This relation may be used in any one of various ways, as pointed out above, for bringing the resistance of the pyrometer circuit to a pre-assigned value.

In the foregoing text most of the examples given have illustrated pyrometric applications. It should be understood, however, that the principles apply to other types of electrical circuits. The following claims refer to electrical measurements or electromotive force measurements. This should be understood to include the measurements of quantities or values depending upon the strength of the electromotive force, for example, a thermoelectric pyrometer may be calibrated to read in terms of temperature only, but the operation of such apparatus is dependent upon the electromotive force developed by the thermocouple under given conditions of temperature, and for correct temperature measurements the same precautions must be taken as for correct measurements of electromotive force.

What we claim as our invention is:

1. Apparatus for making E. M. F. measurements comprising in combination, a source of E. M. F., an instrument operating on the galvanometric principle and variable resistance in series with the source of E. M. F., and means for determining the adjustment of resistance in series with the source of E. M. F. requisite to give the total resistance of the entire circuit a pre-assigned value, said means including a normally open shunt across part of the electric circuit containing the galvanometer coil, said shunt including a pre-assigned resistance, and means for reducing the resistance in the rest of the circuit until the respective deflections of the galvanometer when the shunt is open and when it is closed bear a pre-assigned relation to one another as for instance identity.

2. Apparatus for making E. M. F. measurements comprising in combination, a source of E. M. F., an instrument operating on the galvanometric principle and variable resistance in series with the source of E. M. F., and means for determining the adjustment of resistance in series with the E. M. F. requisite to give the total resistance of the entire circuit a pre-assigned value, said means including a normally open shunt across part of the electric circuit containing the galvanometer coil, said shunt including a pre-assigned resistance, means for reducing the resistance in the rest of the circuit until the respective deflections of the galvanometer when the shunt is open and when it is closed bear a pre-assigned relation to one another as for instance identity, and means for replacing the adjustable resistance by its complement.

3. Apparatus for making E. M. F. measurements comprising a source of E. M. F., an indicator operating upon the galvanometric principle and variable resistance in series with said source of E. M. F., combined with means for determining the proper adjustment of resistance in series with said source of E. M. F. requisite to give the total resistance comprising the adjustable resistance, the line resistance and the source resistance a pre-assigned value, said means comprising a shunt across part of the circuit containing the galvanometer coil, a pre-assigned resistance in said shunt, said resistance being relatively small as compared with that of the part of the circuit shunted, thereby insuring the magnification of errors, a shunt of another part of the circuit, said shunts being normally open, means for closing said shunts, and means for adjusting the resistance in series with the source of E. M. F.

4. Apparatus for making E. M. F. measurements comprising an instrument operating upon the galvanometric principle, an adjustable resistance and source of E. M. F. all in series, means for determining the adjustment of said resistance in series with said source of E. M. F. requisite to give the total resistance comprising the adjustable resistance, the line resistance, and the source resistance a pre-assigned value, said means comprising a shunt across part of the electrical circuit containing the galvanometer coil, a pre-assigned resistance in said shunt, the resistance in said shunt containing copper and manganin the ratio of copper to manganin being proportioned to compensate to the desired extent for the temperature coefficient of the galvanometric indicator, a shunt of another part of the circuit, said shunts being normally open, means for closing said shunts, and means for adjusting the resistance in series with the source of E. M. F.

5. The method of making E. M. F. measurements, with the aid of an indicator operating on the galvanometric principle and connected in series with an adjustable resistance and a source of E. M. F., comprising determining and effecting the adjustment of resistance in series with the source of E. M. F. requisite to give the total resistance of the entire circuit a pre-assigned value, said determination being made and said adjustment effected by shunting part of the electrical circuit containing the galvanometer coil through a pre-assigned resistance, and reducing the resistance in the rest of the circuit until the respective deflections of the galvanometer before and after said shunting and reduction of resistance bear a pre-assigned relation as for instance identity.

6. The method of making E. M. F. measurements, with the aid of an instrument operating on the galvanometric principle and connected with a source of E. M. F., comprising determining and effecting the adjustment of resistance in series with the source of E. M. F. requisite to give the total resistance of the entire circuit a pre-assigned value, said determination being made and said adjustment effected by shunting part of the electrical circuit containing the galvanometer coil through a pre-assigned resistance, and reducing the resistance in the rest of the circuit until the respective deflections of the galvanometer before and after said shunting and reduction of resistance bear a pre-assigned relation as for instance identity, and then replacing the adjustable resistance by its complement.

7. The method of making E. M. F. measurements comprising observing the deflection of an indicator operating upon the galvanometric principle used in combination with an adjustable resistance and a source of E. M. F. to be measured, determining the adjustment of resistance in series with the source requisite to give the total resistance comprising the adjustable resistance, the line resistance and the source resistance a pre-assigned value, said determination being effected by shunting part of the current in the aforesaid electrical circuit containing the galvanometer coil through a pre-assigned resistance relatively small as compared with the resistance of the part of the circuit which it shunts, thus introducing the feature of magnification of errors, shunting another part of the circuit, and adjusting the resistance until the deflection of the galvanometer is the same with and without the shunts.

8. The method of making electrical measurements comprising observing the deflection of an indicator operating upon the galvanometric principle and located in series with a source of E. M. F. whose E. M. F. is to be measured, determining the adjustment of resistance in series with the source of E. M. F. requisite to give the total resistance comprising the adjustable resistance, the line resistance and the resistance of the source of E. M. F. a pre-assigned value, said determination being effected by shunting part of the aforesaid electrical circuit containing the galvanometer coil through a pre-assigned resistance, shunting another part of the circuit, and adjusting the resistance until the deflection of the galvanometer is the same with and without the shunts.

9. In devices for making electrical measurements by means of the deflections of a galvanometric instrument which is connected to the source of E. M. F. by means of suitable leads and through adjustable resistance provided for making proper correction for the resistance of said source of E. M. F. and connecting leads in order that the said galvanometric instrument may read correctly, the apparatus for determining the proper adjustment of said adjustable resistance consisting of an electrical switch connected to shunt and series resistances forming part of the special apparatus, the closing of said switch causing currents of electricity to flow differently through said shunt and series resistances and said adjustable resistance than when the switch is open, and also causing change in strength of current flowing through the galvanometer when said adjustable resistance is incorrectly adjusted, such change of current through galvanometer causing change of deflection, thus indicating incorrect adjustment of said adjustable resistance, and the galvanometric instrument being calibrated to read correctly when connected with said shunt and series resistances with said switch in the operating position.

10. An indicating circuit comprising a variable source of potential, indicating means calibrated to indicate variations of potential produced by said source for predetermined relations of resistances embodied in said circuit, and auxiliary circuit connections comprising a shunt around the said indicating means which when manipulated cause said means to indicate any substantial variations in the predetermined relations of the resistances of said first mentioned circuit.

11. In a measuring system, a circuit comprising a source of potential variably responsive to changes in physical conditions, and a measuring means calibrated to accurately indicate changes in potentials generated by said source for a predetermined relation of resistances embodied in said circuit; auxiliary circuit connections comprising a shunt around said measuring means including said source and said measuring means, proportioned and arranged to cause deviations from said pre-determined relations of resistances in said first mentioned circuit to be indicated on said measuring means; and means in said first mentioned circuit to restore said predetermined relations of resistances therein.

12. In a system comprising a main circuit embodying a means for varying the current values therein in response to changes in conditions to be measured, an instrument calibrated to indicate the changes in said conditions when predetermined relations exist in said main circuit comprising a plurality of shunt circuits around said instrument, and an auxiliary circuit arranged to be manipulated to indicate on said instrument, deviations from said predetermined relations in said main circuit; the method of operation which comprises the steps of manipulating said auxiliary circuit to indicate deviations from said predetermined relations in said main circuit, establishing the predetermined relations in said main circuit when necessary, and then observing the readings of said instrument to determine the conditions to be measured.

13. An indicating circuit comprising a variable source of potential, indicating means calibrated to indicate variations of potential produced by said source for predetermined relations of resistance embodied in said circuit, and auxiliary circuit connections comprising a shunt around said indicating means which when manipulated cause said means to indicate substantial variations in the predetermined relations of the resistances of said first mentioned circuit.

14. The combination as set forth in claim 13 in which said shunt circuits are normally open and are adapted to be closed to indicate variations in the predetermined relations of resistance of said first mentioned circuit.

15. In an electrical measuring system comprising a main circuit of fixed predetermined resistance; means connected in said circuit and responsive to the changes in conditions external thereto to vary the current flow in said circuit; an instrument connected in said circuit calibrated to indicate the changes in said external conditions when the resistance of said circuit is at said predetermined value; and a three-branch shunt arranged to be connected to said main circuit in a manner to cause the said instrument to indicate the existence of faults in said circuit.

16. The combination as set forth in claim 15 in which said three-branch shunt is normally open and is adapted to be closed to indicate faults in said main circuit.

17. An indicating circuit comprising a variable source of potential, indicating means calibrated to indicate variations of potential produced by said source for predetermined relations of resistances embodied in said circuit; and auxiliary circuit connections which when manipulated cause a variation in indication on said indicating means only when the resistance relations in said first-mentioned circuit differ from said predetermined relations.

18. The combination as set forth in claim 17 together with means for restoring the resistance relations of said first mentioned circuit to said predetermined relations after a deviation therefrom.

19. The combination as set forth in claim 17 in which the variation of the indication of said indicating means is a function of the change of the resistance relations in said first mentioned circuit; together with means for restoring the resistance values to said predetermined relations.

20. The combination as set forth in claim 17 in which the variation of said indicating means is a function of the change of the resistance relations of said first mentioned circuit.

In testimony whereof we affix our signatures.

THOMAS RANDOLPH HARRISON.
PAUL DARWIN FOOTE.